3,429,877
AZOLE COMPOUNDS
Erwin Maeder, Aesch, Basel-Land, Peter Liechti, Binningen, Leonardo Guglielmetti, Birsfelden, and Adolf Emil Siegrist, Basel, Switzerland, assignors to Ciba Limited, Basel, Switzerland, a company of Switzerland
No Drawing. Filed Feb. 2, 1966, Ser. No. 524,503
Claims priority, application Switzerland, Feb. 15, 1965, 1,993/65
U.S. Cl. 260—240    8 Claims
Int. Cl. C09b 23/14; D06l 3/12

ABSTRACT OF THE DISCLOSURE

New compounds are provided which may be represented by the formula

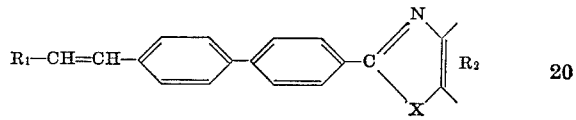

where $R_1$ represents a benzene residue, $R_2$ a benzene or naphthalene residue which is condensed with the azole ring in the manner indicated by the valency lines, and X represents either oxygen, the group —NH— or the group

where A represents, for example, a lower alkyl, alkenyl or hydroxyalkyl group or an aralkyl radical such as benzyl. The benzene or naphthalene ring $R_2$ is condensed with the azole ring in the manner indicated by the valency lines. The residues $R_1$ and $R_2$ may contain further substituents.

The compounds of this invention are useful as optical brighteners for organic materials.

---

The present invention provides valuable, new azole compounds of the formula (1)

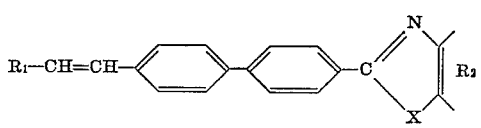

where $R_1$ represents a benzene residue, $R_2$ a benzene or naphthalene residue which is condensed with the azole ring in the manner indicated by the valency lines, and X represents the complement to the azole ring.

The new compounds of the Formula 1 may preferably be oxazole (X=oxygen) or imidazole compounds. The imidazole compounds contain as group X either preferably an —NH— group or a group

where A represents a substituent, for example a lower alkyl, alkenyl or hydroxyalkyl group or an aralkyl radical such as benzyl. The benzene or naphthalene ring $R_2$ of the compounds of the Formula 1 is condensed with the azole ring in the manner indicated by the valency lines, that is to say that two carbon atoms are at the same time ring members of the aromatic and of the heterocyclic ring systems. The residues $R_1$ and $R_2$ may contain further substituents.

From among the azole compounds of the above Formula 1 there may be mentioned those which correspond to the formula (2)

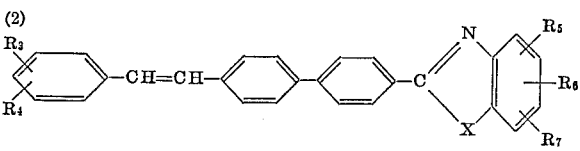

where X stands for an

group (in which A has the above meaning) or preferably for an oxygen atom; $R_3$ represents a hydrogen atom, an alkyl or alkoxy group, a halogen atom, a nitrile group, a carboxylic acid group, a carboxylic acid ester or amide group, a sulphonic acid group or a sulphonamide group; $R_4$ represents a hydrogen atom or an alkyl group; $R_5$ and $R_6$ are identical or different and each represents a hydrogen atom, a halogen atom such as chlorine, a linear or branched alkyl group containing advantageously no more than 18 carbon atoms, a cycloalkyl, phenylalkyl, phenyl, alkenyl, hydroxyalkyl, alkoxyalkyl or halogenalkyl group, a hydroxyl group, an alkoxy, aralkoxy or phenoxy group, a nitrile or cyanoalkyl group, a carboxylic acid group, a carboxylic acid ester or carboxylic acid amide or carboxylic acid hydrazide group, a carboxyalkyl or carbalkoxy-alkyl group, a sulphonic acid group, a sulphonic acid ester group, sulphonamide, alkylsulphone or arylsulphone group, an amino group which may be substituted by alkyl, hydroxyalkyl or acyl radicals, or $R_5$ and $R_6$ together with two vicinal carbon atoms of the benzene ring may also form a 6-membered alicycle, and $R_7$ represents a hydrogen atom or a lower alkyl group.

Of special value are azole compounds of the formula (3)

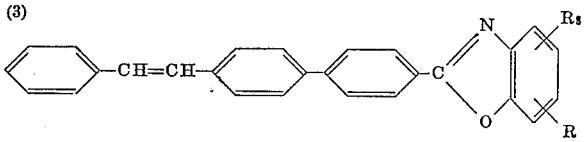

where $R_8$ and $R_9$ are identical or different and each represents a hydrogen atom, a halogen atom, a linear or branched alkyl group containing 1 to 12 carbon atoms, a cycloalkyl group, a phenylalkyl group, a phenyl group, an alkoxy group containing 1 to 6 carbon atoms, a carbalkoxyalkyl group, a carbonamide-alkyl group, or a sulphonic acid group, and $R_8$ together with $R_9$ and two vicinal carbon atoms of the benzene ring may form a 6-membered alicycle. Within the scope of this definition the carbalkoxyalkyl group and the carbonamide-alkyl group contain as a rule no more than 8 carbon atoms, the phenylalkyl group no more than 4 carbon atoms in the alkyl grouping, and the cycloalkyl group is in most cases a cyclohexyl group.

The azole compounds of the Formula 1, 2 or 3 may be prepared by known methods.

According to one manufacturing process, for example, carboxylic acids or halides thereof, especially carboxylic acid chlorides of the formula (4) 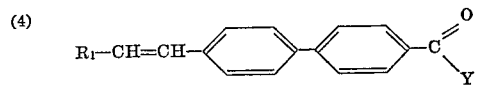

—where Y represents a hydroxyl group or a halogen atom, especially a chlorine atom—are reacted with an orthoamino compound of the formula (5) 

in which process it is possible to obtain, for example, also intermediates, for example compounds of the formula (6) 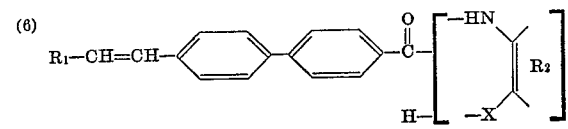

$R_1$, $R_2$ and X in the above Formulae 4 to 6 have the meanings defined above.

The reaction between the selected components (4) and (5) may be carried out with or without intermediate isolation of the first formed intermediate of the Formula 6 by heating at an elevated temperature, for example at 120 to 350° C., advantageously in an inert gas, for example in a current of nitrogen, if desired in the presence of a catalyst. Suitable catalysts are, for example, boric acid, boric anhydride, zinc chloride or para-toluenesulphonic acid, also polyphosphoric acids including pyrophosphoric acid. When boric acid is selected as catalyst, it is advantageously used in an amount from 0.5 to 5% of the total weight of the reaction mixture. There may additionally be used high-boiling, polar, organic solvents, for example dimethylformamide, dichlorobenzene, trichlorobenzene, or aliphatic, if desired etherified, hydroxy compounds, for example propyleneglycol, ethyleneglycol monoethyl ether or diethyleneglycol diethyl ether and high-boiling esters of phthalic acid, for example dibutyl phthalate.

In the two-stage performance of the process the carboxylic acid halide of the Formula 4 may be first condensed with the ortho-amino compound of the Formula 5 in the presence of an inert organic solvent such as toluene, xylenes, chlorobenzene, dichlorobenzene, trichlorobenzene or nitrobenzene at a temperature within the range from 100 to 200° C., whereupon the resulting acyl compound of the formula 6 is converted at a temperature within the range from 150 to 350° C., if desired in the presence of a catalyst, into the benzazole compound of the Formula 1, 2 or 3. When a carboxylic acid chloride is to be used as starting material, it may be manufactured immediately before the condensation with the ortho-amino compound from the free carboxylic acid and thionylchloride, if desired in the presence of a catalyst such as pyridine, in the solvent in which afterwards the condensation is to be performed.

The carboxylic acids of the Formula 4 required in the above-mentioned process can be prepared by the Meerwein method, represented by the equations (7) 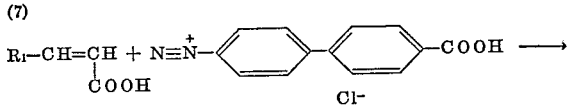
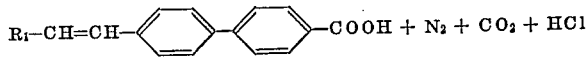

If desired, there may be introduced in the azole derivatives of the Formula 1, 2 or 3 obtained by the process described above substituents covered by the definition of these formulae, by further reactions, for example by sulphonation (for example with sulphuric acid monohydrate, with chlorosulphonic acid or with sulphuric acid containing sulphur trioxide), by oxalkylation of hydroxyl groups of compounds of the Formula 1 with alkylene oxide, by way of conventional esterification reactions, halogenalkylations or the like.

The new azole derivatives of the composition defined above display in the dissolved or finely dispersed state a more or less pronounced fluorescence; they may be used for optically brightening a wide variety of organic materials. Good results are obtained, for example, in brightening epoxy resins, aldehyde resins, such as condensation products of formaldehyde with phenol, urea or aminotriazine, furthermore acrylic resin lacquers, alkyd resin lacquers, cellulose ester lacquers, for example acetylcellulose lacquers or nitrocellulose lacquers. The new azole derivatives are particularly suitable for optically brightening synthetic fibres, for example from cellulose esters, cellulose propionate or acetyl cellulose (cellulose diacetate or cellulose triacetate; acetate rayon), especially from polyamides (for example nylon) and polyesters or from polyolefines such as polyethylene or polypropylene, as well as films, foils, tapes or shaped bodies from these materials or other materials such as polyurethanes, polystyrene, polyvinylchloride, polyvinylidenechloride, polyvinyl alcohol or polyvinyl esters of organic acids, for example polyvinylacetate or other products accessible by polycondensation or homopolymerization or copolymerization, and finally those from regenerated cellulose, including staple rayon. The new azole derivatives may also be used for brightening natural fibres, for example cotton, linen and wool. Particularly valuable are the brightening effects achieved with the compounds of this invention— especially those of the Formula 3—in the case of polyamides, for example when applied from the spinning melt.

When fibres, which may be either staple fibres or monofils, in the unprocessed state, in the form of hanks or fabrics, are to be optically brightened according to this invention, this is advantageously carried out in an aqueous medium in which the selected compounds are suspended. If desired, the treatment may be carried out in the presence of a disversant, for example a soap, polyglycol ether of a fatty alcohol, fatty amine or an alkylphenol, cellulose sulphite waste liquor or a condensation product of a (possibly alkylated) naphthalenesulphonic acid with formaldehyde. It is specially advantageous to work in a neutral, weakly alkaline or acidic bath. Likewise, it is advantageous to perform the treatment at an elevated temperature from about 50 to 100° C., for example at the boiling temperature of the bath or in its vicinity (about 90° C.). The improvement according to this invention may also be carried out with solutions in organic solvents.

The new azole derivatives to be used in the present process may also be added to, or incorporated with, the materials before or during their shaping. Thus, they may be added to the moulding composition in the manufacture of films, foils, tapes or shaped bodies, or they may be dissolved or finely dispersed in the spinning composition before spinning it. The new brighteners may also be added to the reaction mixture before or during the polycondensation leading, for example, to polyamides or especially polyesters, or to the polymer masses before or during the polymerization of monomers, for example vinylacetate or styrene.

The new azole derivatives are distinguished by their particularly good thermostability, fastness to light and migration resistance.

The amount of the new azole derivative to be used according to this invention, referred to the weight of the material to be optically brightened, may vary within wide limits. Even very small amounts, in some cases for instance as little as 0.005% by weight, may suffice to produce a distinct and durable effect, though it is also possible to use amounts of up to about 0.5% by weight or more.

The new azole derivatives, to be used as brightening agents, may also be applied as follows:

(a) In admixture with dyestuffs or pigments or as additives to dyebaths, or printing, discharge or reserve pastes. Also for after-treating dyeings, prints or discharge prints.

(b) In admixture with so-called "carriers," antioxidants, light filters, heat stabilizers, chemical bleaches or as additives to bleaching baths.

(c) In admixture with dressings such as starch or synthetic dressings. It may also be of advantage to add the products of this invention to the liquors used for producing an anti-crease finish.

(d) In combination with detergents. The detergent and the optical brightener may be added separately to the washing liquor. It is also advantageous to use detergents that as such already contain a share of brightening agent. Suitable detergents are e.g. soaps, salts of sulphonate washing agents e.g. of sulphonated benzimidazoles substituted on the carbon atom 2 by higher alkyl radicals, also salts of monocarboxylic acid esters of 4-sulphophthalic acid with higher fatty alcohols, also salts of fatty alcohol sulphonates, alkylarylsulphonic acids or condensation products of higher fatty acids with aliphatic hydroxysulphonic or aminosulphonic acids. Furthermore, there may be used non-ionic detergents e.g. polyglycol ethers derived from ethylene oxide and higher fatty alcohols, alkylphenols or fatty amines.

If the present process is to be combined with other treatment or improving operations, the combined treatment is advantageously performed with the aid of a suitable preparation. These stable preparations are characterized in that they contain compounds of the above Formula 1, 2 or 3 as well as dispersants, detergents, carriers, dyestuffs, pigments or dressing agents.

The compounds of the above Formula 1, 2 or 3 may also be fixed on a finely dispersed support. They may also be used as scintillators for various photographic purposes such as electrophotographic reproduction or for supersensitizing.

EXAMPLE 1

6 grams of 4-phenyl-stilbene-4''-carboxylic acid of the formula (8)

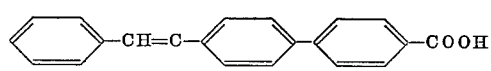

are pasted with 3 g. of 1-amino-2-hydroxybenzene and 0.5 g. of boric acid and then heated under nitrogen for 20 minutes at 270° C.; water escapes and a clear melt forms which is dissolved in ½ litre of dimethylformamide, and a small residue of undissolved matter is filtered off. The filtrate is evaporated and allowed to cool, to yield about 6 g. of a yellow powder which melts unsharply at 300° C. Crystallization from chlorobenzene, while decolorizing with bleaching earth, and another crystallization from dimethylformamide yields the compound of the formula (9)

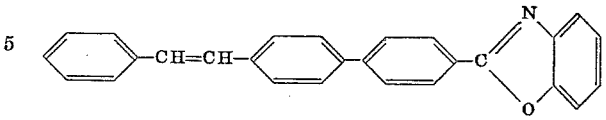

in the form of colourless leaflets melting at 308–310° C.
$C_{27}H_{19}ON$ (373.43), calculated: C, 86.84; H, 5.13; N, 3.75%. Found: C, 86.77; H, 5.21; N, 3.70%.

The 4-phenyl-stilbene-4''-carboxylic acid of the Formula 8 used as starting material can be prepared by the Meerwein reaction in the following manner:

213 grams of 4'-amino-diphenyl-4-carboxylic acid are stirred with 500 g. of glacial acetic acid, 220 g. of concentrated hydrochloric acid, 400 g. of ice and 300 ml. of water. Within 8 hours a solution of 70 g. of sodium nitrite in 140 ml. of water is dropped in, while cooling with ice to maintain the temperature of the reaction mixture at 0 to 5° C. The thickly liquid crystalline magma is stirred overnight at this temperature. A cooled solution of 148 g. of cinnamic acid in 1800 ml. of acetone is then tipped in while stirring well, and the resulting suspension is adjusted with about 130 ml. of sodium hydroxide solution to a pH value of 3.0 to 3.5. Then, in the course of 5 to 6 hours at 0 to 5° C., 90 to 100 g. of an equimolecular mixture of copper and cupric chloride are added portionwise, after which no more gas is being evolved. The temperature of the reaction mixture is then allowed to rise to 20° C. and the acetone is distilled off with steam. At an elevated temperature about 600 ml. of concentrated ammonia solution are then added, the batch is allowed to cool while being stirred, suction-filtered and the residue is rinsed with water, then mixed at the boil with 3 litres of water, and concentrated hydrochloric acid is added until a strongly acid reaction to Congo red has been reached. The batch is suction-filtered and the residue rinsed with hot water. After drying, there are obtained 119 g. of a brown-beige powder which is dissolved in a large amount of boiling dioxan. The undissolved matter is filtered off, and the filtrate concentrated and allowed to cool.

There are obtained 55 g. of a light-brown, crystalline powder which melts unsharply between 315 and 325° C. Two further crystallizations from dioxan with addition of active carbon furnish 4-phenyl-stilbene-4''-carboxylic acid of the Formula 8 in the form of faintly beige-coloured leaflets melting at 328 to 329° C. by sublimation in a high vacuum a colourless powder of identical melting point is obtained.

$C_{21}H_{16}O_2$ (300.34), calculated: C, 83.98; H, 5.37; O, 10.65%. Found: C, 83.99; H, 5.30; O, 10.82%.

EXAMPLE 2

A mixture of 9.0 g. of 4-phenyl-stilbene-4''-carboxylic acid of the Formula 8, 5.0 g. of 4-hydroxy-3-amino-tertiary butylbenzene, 500 mg. of boric acid and 20 ml. of diethyleneglycol-di-n-butyl ether is heated under nitrogen for one hour at 250 to 260° C. Water escapes and a dark solution forms which is allowed to cool and then mixed at 100 to 120° C. with 80 ml. of ethyl alcohol. The resulting precipitate is suctioned off at room temperature and rinsed with a small amount of alcohol and dried, to yield 12.2 g. of a light-beige, crystalline powder melting at 288 to 290° C. Crystallization from toluene with addition of bleaching earth furnishes the benzoxazolyl compound of the formula (10)

in the form of a yellowish, crystalline powder melting at 290 to 292° C.

$C_{31}H_{27}ON$ (429.53), calculated: C, 86.68; H, 6.34; N, 3.26%. Found: C, 86.45; H, 6.33; N, 3.09%.

In a similar manner the following benzoxazolyl compounds may be prepared:

(11)

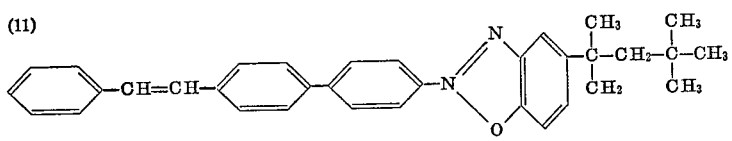

Colourless, crystalline powder from toluene, melting at 260 to 261° C.

$C_{35}H_{35}ON$ (485.64), calculated: C, 86.56; H, 7.26; N, 2.88%. Found: C, 86.25; H, 7.12; N, 2.81%.

(12)

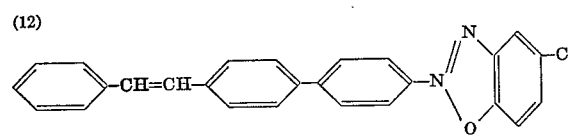

Yellowish, crystalline powder from toluene, melting at 328 to 330° C.

$C_{28}H_{21}ON$ (387.46), calculated: C, 86.79; H, 5.46; N, 3.62%. Found: C, 86.60; H, 5.58; N, 3.65%.

(13)

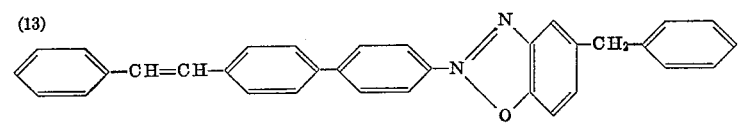

Yellowish, crystalline powder from dimethylformamide, melting at 295 to 297° C.

$C_{34}H_{25}ON$ (463.55), calculated: C, 88.09; H, 5.44; N, 3.02%. Found: C, 88.10; H, 5.51; N, 2.88%.

(14)

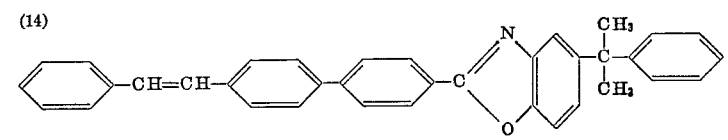

Yellowish, crystalline powder from dimethylformamide, melting at 258 to 260° C.

$C_{36}H_{29}ON$ (491.60), calculated: C, 87.95; H, 5.94; N, 2.85%. Found: C, 88.06; H, 5.99; N, 2.83%.

(15)

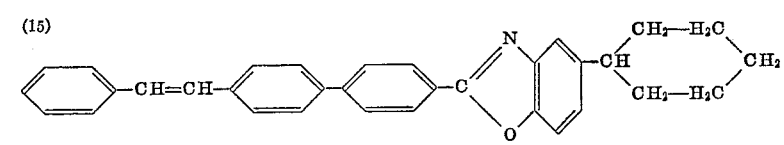

Colourless, crystalline powder from toluene, melting at 293–295° C.

$C_{33}H_{29}ON$ (455.57), calculated: C, 87.00; H, 6.42; N, 3.07%. Found: C, 87.10; H, 6.63; N, 3.04%.

(16)

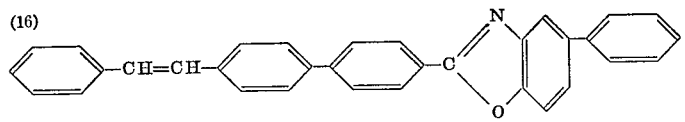

Faintly yellowish flakes from ortho-dichlorobenzene, melting at 330 to 332° C.

$C_{33}H_{23}ON$ (449.52), calculated: C, 88.17; H, 5.16; N, 3.12%. Found: C, 88.03; H, 5.21; N, 3.20%.

(17)

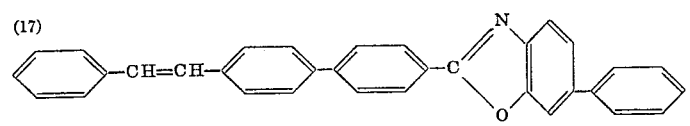

Pale yellowish flakes from chlorobenzene, melting at 290 to 291° C.

$C_{33}H_{23}ON$ (449.52), calculated: C, 88.17; H, 5.16; N, 3.12%. Found: C, 88.19; H, 5.17; N, 3.14%.

(18)

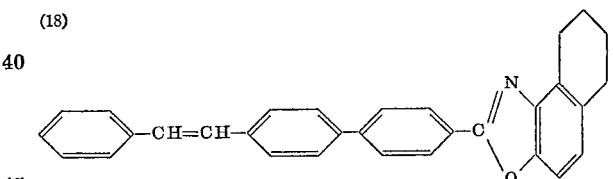

Yellowish, crystalline powder from toluene, melting at 250 to 252° C.

$C_{31}H_{25}ON$ (427.52), calculated: C, 87.09; H, 5.89; N, 3.28%. Found: C, 877.12; H, 5.95; N, 3.26%.

(19)

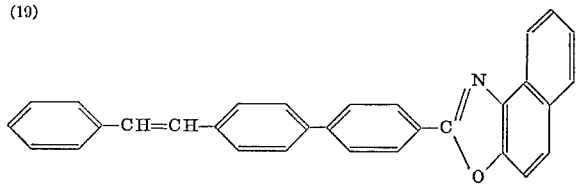

Light-yellow, flakes from dimethylformamide, melting at 270 to 271° C.

$C_{31}H_{21}ON$ (423.49), calculated: C, 87.91; H, 5.00; N, 3.31%. Found: C, 87.51; H, 5.10; N, 3.37%.

(20)

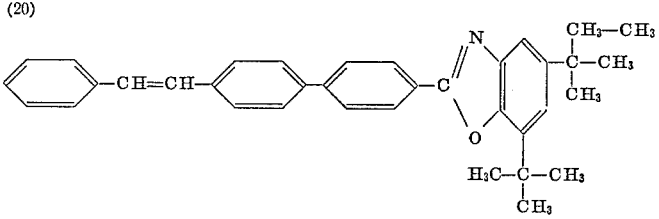

Colourless leaflets from dimethylformamide, melting at 256 to 257° C.
$C_{36}H_{37}ON$ (499.66), calculated: C, 86.53; H, 7.46; N, 2.80%. Found: C, 86.60; H, 7.46; N, 2.89%.

(21)

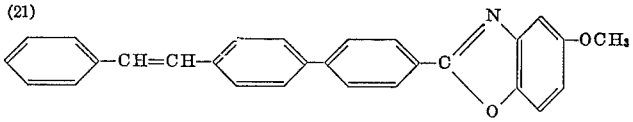

Yellow flakes from toluene, melting at 324 to 326° C.
$C_{28}H_{21}ON$ (403.46), calculated: C, 83.35; H, 5.25; N, 3.47%. Found: C, 83.64; H, 5.42; N, 3.53%.

(22)

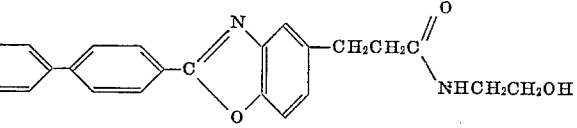

Pale yellow flakes from toluene, melting at 336 to 338° C.
$C_{27}H_{18}ONCl$ (407.90), calculated: C, 79.50; H, 4.45; N, 3.43%. Found: C, 79.80; H, 4.52; N, 3.57%.

EXAMPLE 3

A mixture of 3.0 g. of 4-phenyl-stilbene-4″-carboxylic acid of the Formula 8, 15 ml. of trichlorobenzene, 5 ml. of thionylchloride and a catalytic amount of pyridine are heated for 3 hours at 90 to 95° C., whereafter no more hydrochloric acid is evolved and a clear solution has formed. The excess thionylchloride is then distilled off under vacuum and the remainder is allowed to cool. There are then added 2.0 g. of 3-amino-4-hydroxyphenylpropionic acid methyl ester and the thin suspension is slowly heated to 180° C., during which hydrochloric acid is eliminated. When hydrochloric acid is no longer being evolved, 500 mg. of boric acid are added and the whole is heated under nitrogen within one hour to 220° C.

The batch is then allowed to cool, methanol is added, and the precipitate formed is suctioned off at room temperature and rinsed with methanol. The residue is crystallized from toluene with addition of bleaching earth, to yield 2.0 g. of a light-beige powder which melts unsharply at 300° C. Recrystallization from toluene with addition of active carbon furnishes the compound of the formula (23)

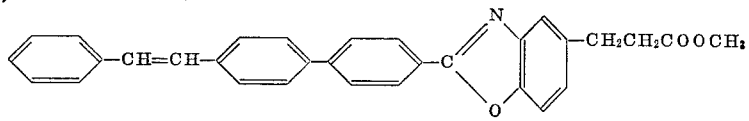

as a pale yellow powder melting at 312 to 315° C.
$C_{31}H_{25}O_3N$ (459.52), calculated: C, 81.02; H, 5.48; N, 3.05%. Found: C, 80.94; H, 5.67; N, 3.00%.

EXAMPLE 4

A mixture of 500 mg. of the benzoxazolyl compound of the Formula 23 and 20 ml. of ethanolamine is refluxed for 30 minutes. The batch is then allowed to cool, diluted with acetone, and the precipitate formed is suctioned off and thoroughly rinsed with acetone. Crystallization from dimethylformamide furnishes 300 mg. of the compound of the formula (24)

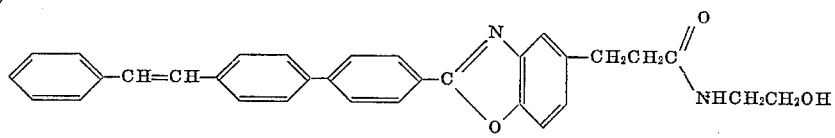

in the form of yellowish flakes melting at 300° C. with decomposition.
$C_{32}H_{28}O_3N_2$ (488.59), calculated: C, 78.67; H, 5.78; N, 5.74%. Found: C, 78.68; H, 5.64; N, 5.71%.

EXAMPLE 5

A mixture of 27 g. of 4-phenyl-stilbene-4″-carboxylic acid of the Formula 8, 9.4 g. of ortho-phenylenediamine, 2 g. of boric acid and 100 ml. of diethyleneglycol-di-n-butyl ether is heated under nitrogen for one hour at 260 to 270° C., during which part of the solvent passes over and a turbid solution forms. The batch is allowed to cool, diluted with alcohol, the precipitate formed is suctioned off and rinsed with alcohol. Crystallization from dimethylformamide furnishes 28.8 g. of a light-beige powder which melts unsharply at 325 to 330° C. Crystallization from dichlorobenzene with addition of bleaching earth furnishes the benzimidazole compound of the formula

(25)
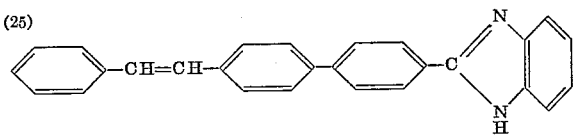

as light-beige flakes melting at 328 to 330° C.

$C_{27}H_{20}N_2$ (372.45), calculated: C, 87.06; H, 5.41; N, 7.52%. Found: C, 87.13; H, 5.50; N, 7.48%.

EXAMPLE 6

A mixture of 6.0 g. of the benzoxazolyl compound of the Formula 17 and 70 ml. of concentrated sulphuric acid is stirred for 2 hours at room temperature (about 20° C.), whereupon a dark, clear solution is obtained which is poured over ice. The free sulphonic acid settles out as a yellow precipitate which is suctioned off, thoroughly expressed, boiled with concentrated hydrochloric acid, once more suctioned off and rinsed with concentrated hydrochloric acid. The residue is then stirred with acetone, suctioned off and thoroughly rinsed with acetone.

After drying, there are obtained 6.1 g. of a dark-yellow powder of the probable formula 26)
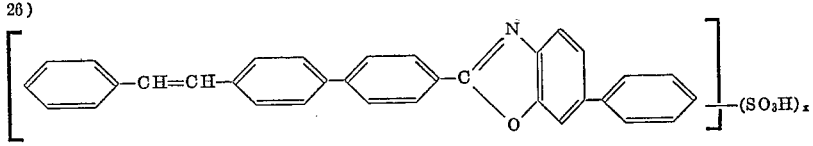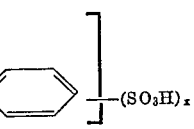

which is soluble in an aqueous alkali solution.

EXAMPLE 7

10. kg. of a polyamide in chip form, prepared in the known manner from hexamethylenediamine adipate, are mixed with 30 g. of titanium dioxide (rutile modification) and 5 g. of the compound of the Formula 9, 10, 11, 12, 16, 17, 18 or 19 for 12 hours in a tumbler. The chips treated in this manner are then melted in a boiler from which the atmospheric oxygen has been displaced with steam and which is heated at 300 to 310° C. by means of oil or diphenyl vapour; the melt is stirred for ½ hour, then expressed through a spinneret under a nitrogen pressure of 5 atmospheres (gauge) and the resulting filament is allowed to cool and then wound on a spinning bobbin. The filaments obtained in this manner display an excellent brightening effect which has good fastness to washing and light.

When the polyamide prepared from hexamethylenediamine adipate is replaced by a polyamide obtained from ε-saprolactam, similar good results are obtained.

EXAMPLE 8

100 grams of polyester granulate from terephthalic acid ethyleneglycol polyester are intimately mixed with 0.05 g. of the compound of the Formulas 9, 10, 12, 13, 14, 15, 16, 17 or 23 and melted at 285° C. while being stirred. Spinning through conventional spinnerets gives rise to strongly brightened polyester fibres.

The compound of the Formula 9, 10, 12, 13, 14, 15, 16, 17 or 23 may also be added to the starting materials before or during the polycondensation leading to the polyester.

EXAMPLE 9

A polyester fabric (for example "Dacron") is padded at room temperature (about 20° C.) with an aqueous dispersion containing per litre 0.1 g. to 1 g. of the benzoxazolyl compound of the Formula 9, 10, 11, 12, 13, 14, 15, 16, 17, 18, 19, 20, 21 or 22 and 1 g. of an adduct from about 35 mols of ethylene oxide with 1 mol of octadecyl alcohol, and the fabric is dried at about 100° C. The dry fabric is then heated for 30 seconds at about 220° C. or for 3 minutes at about 160° C. The polyester fabric treated in this manner has a substantially higher white content than it had before the treatment.

EXAMPLE 10

A bleached polyamide fabric from staple fibres (nylon spun) is treated at a goods-to-liquor ratio of 1:30 for 30 minutes at 60 to 95° C. in a bath which contains— referred to the fibrous material—0.1% of the compound of the Formula 9, 18, 19 or 25 as well as 1% of an adduct from about 35 mols of ethylene oxide with 1 mol of octadecyl alcohol (dispersant) and 1% of acetic acid. After rinsing and drying, the treated fabric has a substantially higher white content than it had before the treatment.

When the polyamide staple fibre fabric is replaced by a fabric from polyamide filament, similar good brightening effects are achieved.

EXAMPLE 11

A bleached fabric from polyamide staple fibres (nylon spun) is padded at room temperature (about 20° C.) with an aqueous dispersion containing per litre 0.1 g. to 1 g. of the benzoxazolyl compound of the Formula 9 or 12 as well as 1 g. of an adduct from about 35 mols of ethylene oxide with 1 mol of octadecyl alcohol, and the fabric is dried at about 80° C., then heated for 3 minutes at about 160° C. The polymeric fabric treated in this manner has a substantialy higher white content than it had before the treatment.

When the fabric from polyamide staple fibres is replaced by a fabric from polyamide filament, similar good brightening effects are obtained.

EXAMPLE 12

Fibres of polyvinylchloride ("Thermovyl") are treated at a goods-to-liquor ratio of 1:40 with 0.05% of the benzoxazolyl compound of the Formula 9, 19 or 25 for 60 minutes at 50 to 95° C. in a bath containing per litre 2 g. of an adduct from about 35 mols of ethylene oxide with 1 mol of octadecyl alcohol (dispersant), then rinsed and dried. The polyvinylchloride fibres obtained in this manner have a substantially higher white content than untreated fibres.

EXAMPLE 13

A fabric from polyvinylchloride ("Thermovyl") fibres is padded at room temperature (about 20° C.) with an aqueous dispersion containing per litre 0.1 g. to 1 g. of the benzoxazolyl compound of the Formula 9 to 12, 14, 15 or 18 as well as 1 g. of an adduct from about 35 mols of ethylene oxide with 1 mol of octadecyl alcohol and dried at about 70° C. The dry material is then heated for 1 minutes at 100° C. The fabric treated in this manner has a substantially higher white content than an untreated fabric from polyvinylchloride fibres.

EXAMPLE 14

A fabric from bleached cotton is impregnated on a padder at room temperature with a solution containing per litre of water 1 to 2 g. of the benzoxazolyl compound of the Formula 9 or 10 as well as 0.5 g. of the adduct from 8 mols of ethylene oxide with 1 mol of para-tertiary octylphenol. After having been expressed and dried, the fabric treated in this manner displays a handsome, bluish white brightening effect.

EXAMPLE 15

A polypropylene fibre fabric is padded at room temperature (about 20° C.) with an aqueous dispersion containing per litre 0.1 g. to 1 g. of the benzoxazolyl compound of the Formula 9 or 10 as well as 1 g. of an adduct from about 35 mols of ethylene oxide with 1 mol of octadecyl alcohol and then dried at about 70° C. The dry fabric is then heated for 1 minute at about 100° C. The fabric from polypropylene fibres treated in this manner has a substantially higher white content than it had before the treatment.

EXAMPLE 16

100 grams of polypropylene fibre grade are intimately mixed with 0.8 g. of the compound of the Formula 9 and then melted at 280 to 290° C. with stirring. The melt is expressed by the usual melt spinning process through conventional spinnerets and then stretched. Strongly brightened polypropylene fibres result.

EXAMPLE 17

50 grams of a fabric from polyacrylonitrile ("Courtelle") are treated for 30 minutes at 85 to 95° C. in a bath containing in 1500 ml. of water 2 ml. of formic acid of 85% strength and 0.01 g. of the imidazole compound of the Formula 25 prepared as described in Example 5, and then rinsed and dried. The material treated in this manner is whiter than when the imidazole compound is not added to the treatment bath.

What is claimed is:

1. A compound of the formula

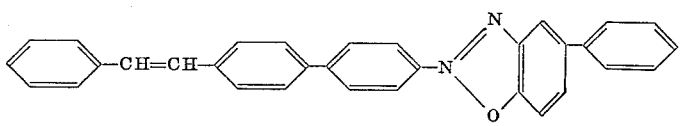

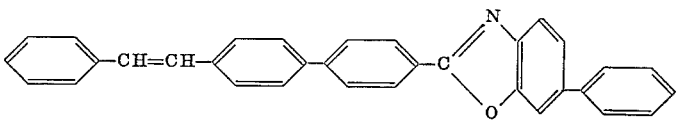

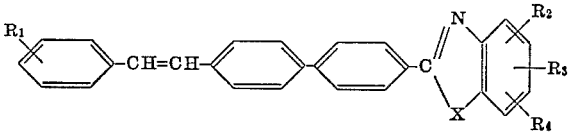

where X represents a member selected from the group consisting of oxygen and —NH—, $R_1$ represents a member selected from the group consisting of hydrogen, alkyl having 1 to 4 carbon atoms, halogen, the carboxylic acid group, carboxylic acid alkyl ester with 1 to 4 carbon atoms in the alkyl group, and the sulphonic acid group; $R_2$ and $R_3$ each represents a member selected from the group consisting of hydrogen, halogen, alkyl having from 1 to 18 carbon atoms, cyclohexyl, phenylalkyl having up to 4 carbon atoms in the alkyl portion, phenyl, alkoxy having 1 to 6 carbon atoms, the carboxylic acid group, carboxylic acid ester, the carboxylic acid amide group, carboxyalkyl, carbalkoxyalkyl, each having up to 8 carbon atoms, alkyl carbonamido having up to 8 carbon atoms and the sulphonic acid group, and $R_2$ and $R_3$ when taken together with two vicinal carbon atoms of the benzene ring, a 6-membered alicycle, and $R_4$ represents a member selected from the group consisting of hydrogen and methyl.

2. The compound of the formula

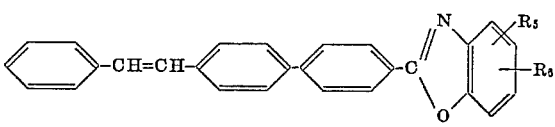

where $R_5$ and $R_6$ each represents a member selected from the group consisting of hydrogen, halogen, alkyl having 1 to 12 carbon atoms, cyclohexyl, a phenylalkyl containing from 1 to 4 carbon atoms in the alkyl portion, phenyl, alkoxy having 1 to 6 carbon atoms, a carbalkoxyalkyl group containing up to 8 carbon atoms, an alkylcarbonamide group containing up to 8 carbon atoms and the sulphonic acid group, and $R_5$ and $R_6$ when taken together with two vicinal carbon atoms of the benzene ring, a 6-membered alicycle.

3. The compound of the formula

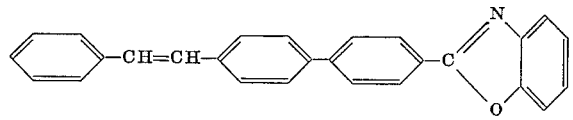

4. The compound of the formula

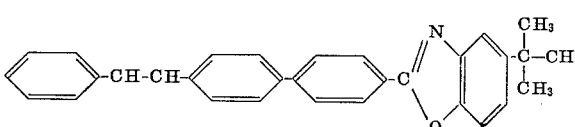

5. The compound of the formula

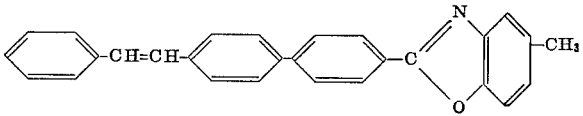

6. The compound of the formula

7. The compound of the formula

8. The compound of the formula

References Cited

UNITED STATES PATENTS 3,133,916   5/1964   Duennenberger et al. __ 260—240
3,260,715   7/1966   Saunders _____ 260—240

JOHN D. RANDOLPH, *Primary Examiner.*

U.S. Cl. X.R.

8—65; 106—176; 117—33.5; 252—89, 301.2; 260—37, 465, 505, 515, 520, 544, 558

UNITED STATES PATENT OFFICE
CERTIFICATE OF CORRECTION

Patent No. 3,429,877　　　　　　　　　　　　　　　　　February 25, 1969

Erwin Maeder et al.

It is certified that error appears in the above identified patent and that said Letters Patent are hereby corrected as shown below:

Column 13, the first two formulas in claim 1 should appear as the formulas in claims 6 and 7, respectively, in column 14; same column 14, lines 19 to 23, the formula should appear as shown below:

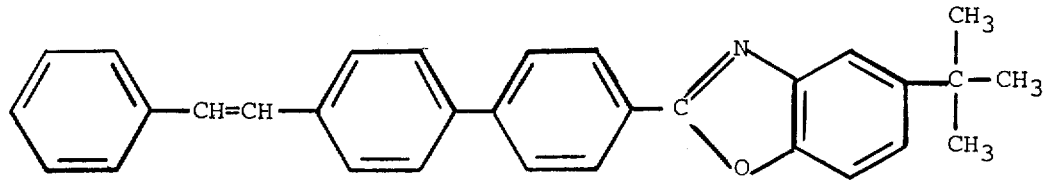

Signed and sealed this 7th day of April 1970.

(SEAL)
Attest:

EDWARD M. FLETCHER, JR.　　　　　　　　　　　　WILLIAM E. SCHUYLER, JR.
Attesting Officer　　　　　　　　　　　　　　　　Commissioner of Patents